(12) United States Patent
Nishimura et al.

(10) Patent No.: US 6,841,140 B2
(45) Date of Patent: Jan. 11, 2005

(54) METHOD AND APPARATUS FOR PRODUCING HYDROGEN FLUORIDE

(75) Inventors: Hironobu Nishimura, Settsu (JP); Toshinobu Takeuchi, Osaka-fu (JP); Yukio Homoto, Settsu (JP); Norio Ema, Settsu (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 10/312,869

(22) PCT Filed: Jul. 6, 2001

(86) PCT No.: PCT/JP01/05868

§ 371 (c)(1),
(2), (4) Date: Jan. 2, 2003

(87) PCT Pub. No.: WO02/04348

PCT Pub. Date: Jan. 17, 2002

(65) Prior Publication Data

US 2003/0124047 A1 Jul. 3, 2003

(30) Foreign Application Priority Data

Jul. 10, 2000 (JP) ........................... 2000-208172

(51) Int. Cl.[7] .............................. B01J 7/00; B01J 19/00; C22C 29/02; C22C 32/00; C01B 7/19
(52) U.S. Cl. ................ 423/483; 423/482; 423/485; 422/224; 422/225; 422/240; 422/210
(58) Field of Search ................. 423/483, 484, 423/485, 482; 422/224, 225, 240, 210, 161; 428/614, 627

(56) References Cited

U.S. PATENT DOCUMENTS

| | | | | |
|---|---|---|---|---|
| 1,701,225 A | * | 2/1929 | Buchner | ..................... 423/485 |
| 2,932,557 A | | 4/1960 | List et al. | |
| 3,063,815 A | * | 11/1962 | Redniss | ..................... 422/200 |
| 3,607,121 A | | 9/1971 | Watson et al. | |
| 4,491,571 A | * | 1/1985 | Suzuki et al. | ............... 423/485 |
| 5,271,918 A | * | 12/1993 | Patterson et al. | ........... 423/485 |

FOREIGN PATENT DOCUMENTS

| | | |
|---|---|---|
| DE | 319931 | 4/1957 |
| EP | 0 096 817 A1 | 12/1983 |
| EP | 0 163 565 A1 | 12/1985 |
| GB | 1 371 790 | 10/1974 |
| GB | 2 159 136 A | 11/1985 |
| JP | 47-15390 | 8/1972 |
| JP | 49-29437 | 8/1974 |
| JP | 57-59626 | 4/1982 |
| JP | 59-39703 | 3/1984 |
| JP | 1-119639 | 5/1989 |
| JP | 4-40282 | 7/1992 |
| JP | 8-199284 | 8/1996 |
| JP | 08-199284 | 8/1996 |
| JP | 2000-001733 | 1/2000 |

* cited by examiner

*Primary Examiner*—Ngoc-Yen Nguyen
(74) *Attorney, Agent, or Firm*—Birch, Stewart, Kolasch & Birch, LLP

(57) ABSTRACT

As to a reactor which is used in a process for producing hydrogen fluoride through a reaction of fluorite with sulfuric acid, and which comprises means for applying a shearing force to a content therein between the means and an inner surface thereof, a metal material is used for at least a portion of a part of the means which part is opposed to the inner surface, the metal material comprising tungsten carbide and a material comprising at least one element, or an alloy comprising two or more elements, selected from the group consisting of nickel, chromium, cobalt, iron, tungsten and carbon, the metal material comprising 30 to 90% by weight of tungsten carbide. Thereby, it becomes possible to reduce the wear of an edge of the means for applying the shearing force to the content (the reaction mixture) between the means and the inner surface.

12 Claims, 3 Drawing Sheets

Fig. 2
(a)
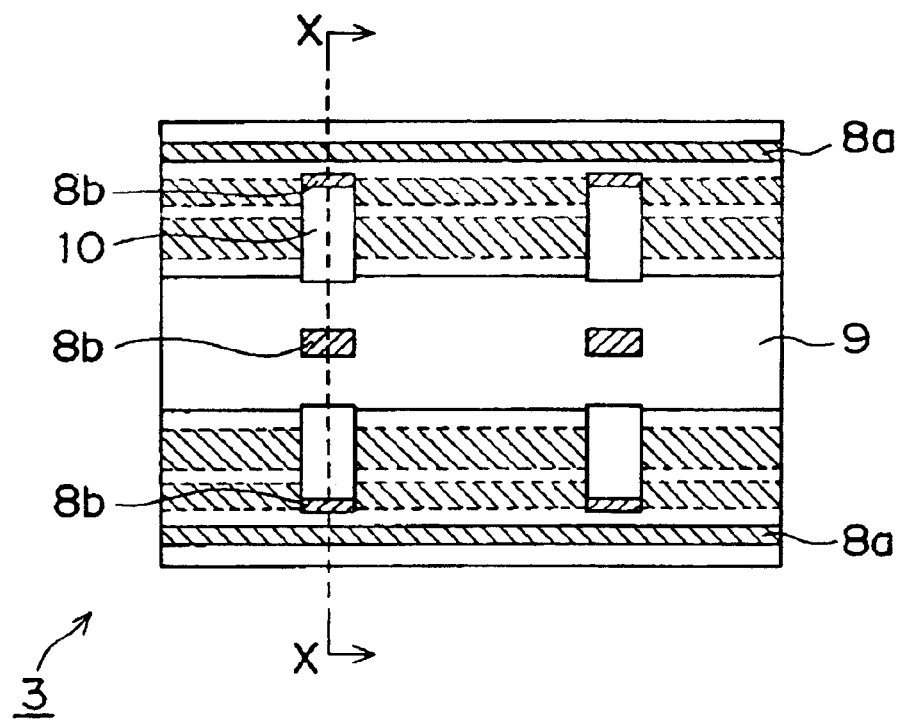
(b)
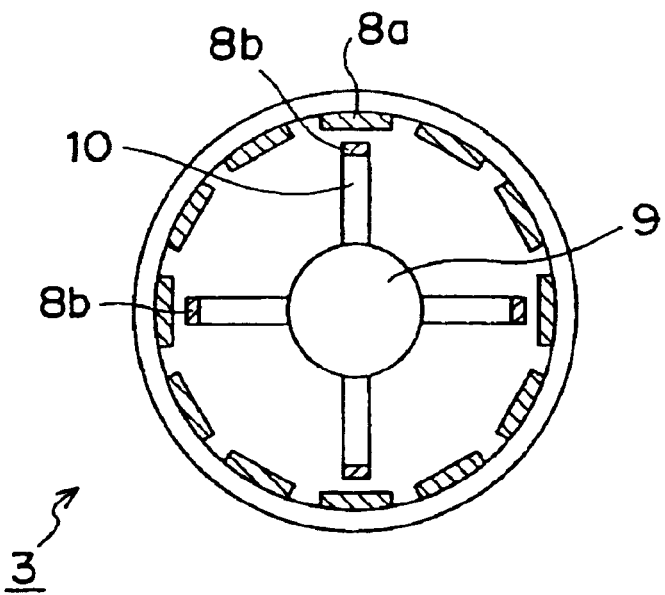

METHOD AND APPARATUS FOR PRODUCING HYDROGEN FLUORIDE

This application is the national phase under 35 U.S.C. § 371 of PCT International Application No. PCT/JP01/05868 which has an International filing date of Jul. 6, 2001, which designated the United States of America.

TECHNICAL FIELD

The present invention relates to an apparatus and a process for producing hydrogen fluoride. More specifically, the present invention relates to a reactor for producing hydrogen fluoride on an industrial scale by reacting a metal fluoride with sulfuric acid; oleum (or fuming sulphuric acid) and water; or a mixture thereof, as well as an apparatus including such reactor and a process in which the same is used.

BACKGROUND ART

As a process for producing hydrogen fluoride (HF) on an industrial scale, a process is conventionally used in which a metal fluoride is reacted with sulfuric acid; oleum and water; or a mixture thereof. The most well known one of such processes is, for example, as follows. Firstly, sulfuric acid ($H_2SO_4$) and fluorite (containing $CaF_2$ as its main component) which is the metal fluoride are separately supplied as raw materials to a prereactor (or a kneading machine) such as an external heating type ko-kneader which is capable of solid-liquid kneading. The reaction partially proceeds in the prereactor by kneading and heating the raw materials, so that hydrogen fluoride is generated through the reaction. Next, a reaction mixture thus obtained is transferred from the prereactor to an external heating type rotary kiln. The reaction further proceeds in the external heating type rotary kiln by rotating and heating the reaction mixture, so that hydrogen fluoride is additionally generated. The generated hydrogen fluoride is recovered as a gaseous product. Such prereactor and rotary kiln are generally made of a corrosion resistant alloy consisting of Ni, Cr, Mo, Fe and so on, such as Hastelloy. Alternatively, these are lined with the corrosion resistant alloy. An example of this kind of process for producing hydrogen fluoride is described in Japanese Patent Kohyo publication No. 4-40282.

DISCLOSURE OF THE INVENTION

The reaction for generating hydrogen fluoride from sulfuric acid (or oleum and water; or a mixture of sulfuric acid, oleum and water) and fluorite which is the metal fluoride (hereinafter which is simply referred to as a "hydrogen fluoride generating reaction"), which is used for the process described above, is an endothermic reaction. A system of the reaction including sulfuric acid is highly corrosive since such system is in a high temperature condition in order to progress the endothermic reaction. Furthermore, the reaction mixture (i.e. a mixture including the raw materials and the reaction products) is in the form of a slurry or paste since it includes unreacted fluorite and sulfuric acid as well as calcium sulfate ($CaSO_4$) which is produced as a byproduct through the hydrogen fluoride generating reaction. This reaction mixture is highly adhesive with respect to an inner surface of a reactor and the like. Therefore, the reactor (the prereactor and the rotary kiln) in which the reaction is conducted, need to satisfy the followings: the reaction mixture can be heated; the inner surface of the reactor and other elements combined with the reactor (such as a mixing blade and the like) all of which are exposed to the reaction system, have a sufficiently high corrosion resistance; and a highly adhesive reaction mixture in the form of the slurry or paste can be handled.

In the prereactor and the rotary kiln as described above, an amount of heat is supplied to a reaction mixture by heat transfer from inner surfaces of them when the reaction mixture contacts with the inner surfaces. However, the reaction mixture not only contacts with but also frequently remains on the inner surface (i.e. the heat transfer surface) and adheres to the inner surface without being removed therefrom, so that a fouling (or an accretion) is formed. If the fouling is formed on the inner surface with a large thickness, a thermal conductivity from the inner surfaces of the prereactor and the rotary kiln to a bulk of the reaction mixture (in other words, a part of the reaction mixture which does not contribute to formation of fouling) is lowered. As a result, the rate of the reaction becomes lowered, and there arises a problem that a production capacity is remarkably lowered.

In order to prevent the formation of a thick fouling, a part of the reaction mixture, which adheres to the prereactor and/or the rotary kiln, is scraped off by means of an edge of a mixing blade and/or a scraping means (or a scraper). A part of the reaction mixture (or a content therein) which exists in a clearance between the edge and the inner surface (hereinafter which is simply referred to as the "clearance") and may partially attach to the inner surface, is prevented beforehand from adhering by an effect of a shearing force generated by the movement of the edge with respect to the inner surface. Alternatively, in the case where a part of the reaction mixture has adhered to the inner surface, the part of the reaction mixture is scraped off therefrom by that effect.

The edges of the mixing blade and the scraping means are positioned to avoid contacting with the inner surface and leave a very small clearance in order to sufficiently apply the shearing force to the reaction mixture existing in the clearance between the edge and the inner surface and effectively scrape it off, otherwise the contact with the inner surface will require an additional power corresponding to its drag and will damage the inner surface. More specifically, the prereactor is designed to have a small clearance between the edge of the mixing blade and the inner surface of the prereactor so that the edge of the mixing blade scrapes off the reaction mixture which has adhered to the inner surface. On the other hand, the rotary kiln is provided with the scraping means to leave a clearance as small as that for the prereactor so that the edge of the scraping means scrapes off the reaction mixture which has adhered to the inner surface of the rotary kiln, though the scraping means may contact with the inner surface in some cases.

Though an alloy material such as Hastelloy consisting of Ni, Cr, Mo, Fe and so on as described above shows a high corrosion resistance, it does not always have a sufficient wear resistance. Therefore, in the case where such alloy material is used for forming the inner surface and the edge having a small clearance with respect to the inner surface (in some cases, the edge may contact with the inner surface), there arises a problem that the edge and/or a material of the inner surface remarkably wear off in a short time. This is because a smaller clearance between the edge and the inner surface makes a larger frictional resistance to which the edge and/or the inner surface is subjected from the reaction mixture in the vicinity of the clearance. As the wear of the edge and the inner surface progresses further, the clearance between them becomes larger. Therefore, an ability of scraping off the reaction mixture which has adhered to the inner surface becomes insufficient, so that a thick fouling is formed.

As an operation period of the apparatus becomes longer, an efficiency of thermal conduction becomes lower since a thicker fouling is formed on the inner surface to reduce an amount of heat conducted from the inner surface to the bulk of the reaction mixture. As a result, an overall production capacity of the apparatus for producing hydrogen fluoride is lowered. Accordingly, in order to restore the production capacity of the apparatus for producing hydrogen fluoride, it is necessary to stop the operation periodically and frequently for the purpose of maintenance such as replacement or repair of the mixing blade and/or the inner surface of the prereactor, and/or the scraping means and/or the inner surface of the rotary kiln, and especially the mixing blade of the prereactor.

The present invention aims to solve the problems described above. More specifically, the present invention is directed to provide a reactor which is used in a process for producing hydrogen fluoride by reacting a metal fluoride with sulfuric acid, oleum and water, or a mixture thereof, and which includes a shearing means (e.g. a mixing blade and a scraping means) for applying a shearing force to a content of the reactor (a reaction mixture) between the shearing means and an inner surface of the reactor, wherein the wear of an edge of the shearing means can be effectively reduced. The present invention is also directed to provide an apparatus including such reactor and a process in which the apparatus is used.

According to the present invention, there is provided a reactor, which is used in a process for producing hydrogen fluoride by reacting a metal fluoride with sulfuric acid, oleum and water, or a mixture thereof, and which includes a shearing means for applying a shearing force to a content of the reactor (a reaction mixture) between the shearing means and an inner surface of the reactor, wherein at least a portion of a part of the means which part is opposed to the inner surface of the reactor, and preferably the whole of said part of the means is made of a metal material including:

(I) a material including at least one element, and preferably an alloy including at least two elements, each selected from the group consisting of nickel, chromium, cobalt, iron, tungsten and carbon; and (II) Tungsten Carbide wherein the metal material includes tungsten carbide at 30–90% by weight. Such metal material shows an improved wear resistance and corrosion resistance in a reaction system for producing hydrogen fluoride. By making at least a portion of a part of the shearing means which part is opposed to the inner surface, for example an edge of the means, from such metal material, the wear of such portion can be effectively reduced. Hereinafter, the metal material having the composition described above is also simply referred to as a "wear resistant-corrosion resistant metal material."

As an example of this wear resistant-corrosion resistant metal material, it is possible to use a material being in the form of a metal matrix which includes at least one element selected from the group consisting of nickel, chromium, cobalt, iron, tungsten and carbon, in which material fine particles of tungsten carbide are dispersed.

The above described wear resistant-corrosion resistant metal material includes tungsten carbide and the material containing at least one element, or an alloy containing at least two element, each selected from the group consisting of nickel, chromium, cobalt, iron, tungsten and carbon, preferably a Co based alloy, and more preferably an alloy including cobalt and chromium. A content of tungsten carbide in the wear resistant-corrosion resistant metal material is 30 to 90% by weight and preferably 50 to 70% by weight on the basis of the total weight of the wear resistant-corrosion resistant metal material. Further, a content of cobalt is preferably 5 to 40% by weight and a content of chromium is preferably 5 to 20% by weight on the basis of the total weight of the wear resistant-corrosion resistant metal material.

More specifically, the present invention can be conducted by applying, for example in a manner of welding, the above described wear resistant-corrosion resistant metal material at least partially and preferably totally to an edge (or an end portion) of the means for applying the shearing force (or the shearing means), and thereby it becomes possible to reduce the wear of the means of the reactor. In the case the wear resistant-corrosion resistant metal material is applied to a portion of the edge of the shearing means, the wear resistant-corrosion resistant metal material may be projected with respect to a surface of the original edge before the application of the metal material, or may be flush with the surface of the original edge (for example, may be embedded in the original edge before the application). Of course, the wear resistant-corrosion resistant metal material can be applied to the whole of the original edge of the shearing means such that the material covers the whole of the original edge before the application or be joined with the whole of the original edge.

Instead of, and preferably in addition to, applying the wear resistant-corrosion resistant metal material to the shearing means, at least a portion of an inner surface of the reactor is made of the above described wear resistant-corrosion resistant metal material. Thereby, the wear of the inner surface of the reactor can be reduced effectively. More concretely, a plurality of strips made of the above described wear resistant-corrosion resistant metal material is applied, for example in a manner of welding, to an inner surface of a conventional reactor which is made of or lined with a general corrosion resistant metal material such as Hastelloy, so that the inner surface of the reactor is partially covered with the above described wear resistant-corrosion resistant metal material, and preferably totally covered with it. Thus, the inner surface of the reactor can be reinforced. An arrangement of the strips applied to the inner surface may be any suitable arrangement having a random (or irregular) or ordered pattern, for example a stripe pattern, a check pattern (a staggered pattern) or a dot pattern.

The present invention is especially suitable for a case where the edge of the shearing means has a function of scraping off a content of the reactor (or the reaction mixture) adhering to the inner surface of the reactor, and has a function of mixing the content as a whole of the means.

It is noted that the hydrogen producing reaction which is conducted in the process for producing hydrogen fluoride of the present invention may be any of the following reactions:

(i) a reaction of a metal fluoride with sulfuric acid;

(ii) a reaction of metal fluoride with oleum and water; and (iii) a reaction of a metal fluoride with a mixture of sulfuric acid, oleum and water.

In a preferred embodiment, the reactor is a prereactor in which the metal fluoride is mixed with sulfuric acid, oleum and water, or a mixture thereof and the reaction partially proceeds. In this case, more specifically, the shearing means is a mixing blade, and the portion of the shearing means which is opposed to the inner surface is an edge of the mixing blade. With respect to this prereactor, at least a portion of and preferably the whole of the edge is made of the above described wear resistant-corrosion resistant metal material. Instead of this, and preferably in addition to this, at least a portion of and preferably the whole of the inner surface is made of the above described wear resistant-corrosion resistant metal material.

As the prereactor used for the present invention, it is possible to use an external heating type reactor having any appropriate number of mixing blades on a single axis or plural axes, wherein a clearance between the inner surface and the edge of the mixing blade is set sufficiently small. For example, it is possible to use an external heating type kneading machine (such as kneader and ko-kneader) having one or more mixing blades of a helical type, a spiral fin type, a stud type, a Σ type, a Z type, a fish tail type or the like. In the case of using the kneading machine having a pair of blades such as the Σ type, the Z type, the fish tail type on two or more axes, the mixing blades can be operated in any appropriate mode such as a tangential or superposed mode.

In other embodiment, the reactor is a rotary kiln in which the reaction further proceeds in the reaction mixture which has been obtained from the reaction of the metal fluoride with sulfuric acid, oleum and water, or a mixture thereof. In this case, more specifically, the shearing means is a scraping means, and the portion of the shearing means which is opposed to the inner surface is an edge of the scraping means. With respect to this rotary kiln, at least a portion of and preferably the whole of the edge is made of the above described wear resistant-corrosion resistant metal material. Instead of this, and preferably in addition to this, at least a portion of and preferably the whole of the inner surface of the rotary kiln is made of the above described wear resistant-corrosion resistant metal material. With the rotary kiln, the inner surface of a cylindrical form rotates along its circumferential direction to turn and mix the content (the reaction mixture) in the rotary kiln.

As the rotary kiln used for the present invention, it is possible to use an external heating type reactor having an inner surface generally in a cylindrical shape, wherein a clearance between the inner surface and the edge of the shearing means is set sufficiently small, or wherein the edge is contacted with the inner surface. The shearing means of the rotary kiln is, for example, a rod-like insert provided with a spiral fin, studs or blades. By rotating the shearing means (the rod-like insert) while rotating the inner surface of the rotary kiln, the edge of the spiral fin, the studs or the blades scrapes off the reaction mixture which has adhered to the inner surface of the rotary kiln. However, the shearing means may be fixed when a blade extending along a length of the rotary kiln is used. The shearing means may be positioned such that the rotation axis thereof is in concentric or eccentric with the rotation axis of the rotary kiln.

In another aspect of the present invention, there is provided a apparatus for producing hydrogen fluoride by reacting a metal fluoride with sulfuric acid, oleum and water, or a mixture thereof characterized in that the reactor of the present invention is used. With respect to this apparatus, at least a portion of and preferably the whole of a part of a shearing means which part is opposed to the inner surface of the reactor, is made of the above described wear resistant-corrosion resistant metal material. Instead of this, preferably in addition to this, at least a portion of and preferably the whole of the inner surface is made of the above described wear resistant-corrosion resistant metal material.

Especially in the case where the hydrogen fluoride producing apparatus includes a prereactor and a rotary kiln, at least one of and preferably the both of the prereactor and the rotary kiln correspond to the reactor of the present invention. For example, at least a portion of and preferably the whole of an edge of at least one of and preferably each of a mixing blade of the prereactor and/or a scraping means of the rotary kiln, is made of the above described wear resistant-corrosion resistant metal material. Instead of this, and preferably in addition to this, at least a portion of and more preferably the whole of the inner surface of at least one of and preferably each of the prereactor and the rotary kiln, is made of the above described wear resistant-corrosion resistant metal material.

In yet another aspect of the present invention, there is provided a process for producing hydrogen fluoride by reacting a metal fluoride with sulfuric acid, oleum and water, or a mixture thereof characterized in that the reactor of the present invention is used. At least a portion of an edge of the shearing means which is opposed to an inner surface of the reactor and/or at least a portion of the inner surface thereof, and preferably both of them, are made of the above described wear resistant-corrosion resistant metal material.

The process for producing hydrogen fluoride by reacting the metal fluoride with sulfuric acid, oleum and water, or the mixture thereof may include a first reaction step wherein the reaction of the metal fluoride with sulfuric acid, oleum and water, or a mixture thereof partially proceeds, and a second reaction step wherein the reaction in the reaction mixture obtained from the first reaction step further proceeds to be substantially completed. Especially in such case, it is applicable to conduct the first reaction step in the prereactor of the present invention or to conduct the second reaction step in the rotary kiln of the present invention, and preferably both of them are applied.

In the first reaction step, more specifically, the reaction mixture containing the metal fluoride and sulfuric acid (or a mixture of fuming acid and water; or a mixture of sulfuric acid, fuming acid and water) as raw materials is heated in the prereactor, and the mixing blade set in the prereactor scrapes off the reaction mixture which is adhering to the inner surface of the prereactor while kneading the reaction mixture. In this manner, the hydrogen fluoride generating reaction partially proceeds to generate hydrogen fluoride. Further in the second reaction step, the reaction mixture obtained after the first reaction step is heated and rotated in the rotary kiln preferably while the edge of the shearing means scrapes off the reaction mixture which is adhering to the inner surface of the rotary kiln, so that the hydrogen fluoride generating reaction further proceeds to generate hydrogen fluoride. Finally, the reaction is substantially completed. Thus, hydrogen fluoride is produced.

As to the process and the apparatus of the present invention, the portion where the above described wear resistant-corrosion resistant metal material is applied among the mixing blade of the prereactor, the shearing means of the rotary kiln and the inner surfaces of the prereactor and the rotary kiln is optionally and suitably determined. For example, under the usual operating conditions, the shearing means of the prereactor (the mixing blade) more often rubs the inner surface of the prereactor compared with the case of the rotary kiln. Thus, it is preferable to reinforce the both of the mixing blade and the inner surface of the prereactor with the above described wear resistant-corrosion resistant metal material. In addition to this, it is more preferable to similarly reinforce the both of the scraping means and the inner surface of the rotary kiln.

As described above, the apparatus and the process for producing hydrogen fluoride and especially those using the prereactor are explained in detail. However, the present invention is not limited to those, and widely applicable to a reactor which has a shearing means such as a mixing blade, and in which a metal fluoride is reacted with sulfuric acid, oleum and water, or a mixture thereof to generate hydrogen fluoride.

Examples of the metal fluoride which can be used for the present invention as described above, include fluorite, sodium fluoride, potassium fluoride, synthesized calcium fluoride and sodium fluorosilicate and so on. Further, a raw material to be reacted with such metal fluoride can be sulfuric acid or other raw material which is capable of producing sulfuric acid. It is possible to use not only sulfuric acid, but also any suitable mixture such as: a mixture of oleum ($SO_3$ and $H_2SO_4$) and water; a mixture of sulfur trioxide ($SO_3$) and water; or a mixture of sulfuric acid, water, and oleum and/or sulfur trioxide.

The present invention includes following modes 1 to 13.

(Mode 1) A reactor which is used for a process for producing hydrogen fluoride through a reaction of a metal fluoride with sulfuric acid, oleum and water, or a mixture thereof and which comprises means for applying a shearing force to a content of the reactor between the means and an inner wall (or an inner surface) of the reactor, wherein at least a portion of a part of the means which part is opposed to the inner wall of the reactor, is made of a metal material which comprises: a material comprising at least one element selected from the group consisting of nickel, chromium, cobalt, iron, tungsten and carbon, or an alloy comprising two or more elements selected from said group; and tungsten carbide, the metal material comprising 30 to 90% by weight of tungsten carbide.

(Mode 2) The reactor according to Mode 1, wherein at least a portion of the inner wall of the reactor is made of said metal material.

(Mode 3) The reactor according to Mode 1 or 2, wherein said metal material is formed by sintering tungsten carbide and the material comprising at least one element selected from a group consisting of nickel, chromium, cobalt, iron, tungsten and carbon, or the alloy comprising two or more elements selected from said group.

(Mode 4) The reactor according to any one of Modes 1 to 3, wherein said metal material comprises 5 to 40% by weight of cobalt.

(Mode 5) The reactor according to any one of Modes 1 to 4, wherein said metal material comprises 5 to 20% by weight of chromium.

(Mode 6) The reactor according to any one of Modes 1 to 5, wherein the reactor is a prereactor in which the metal fluoride is mixed with sulfuric acid, oleum and water, or the mixture thereof, and the reaction thereof partially proceeds.

(Mode 7) The reactor according to Mode 6, wherein the means for applying the shearing force is a mixing blade, and the part of the means, which part is opposed to the inner wall, is an edge of the mixing blade.

(Mode 8) The reactor according to any one of Modes 1 to 5, wherein the reactor is a rotary kiln in which a reaction mixture resulting from the reaction of the metal fluoride with sulfuric acid, oleum and water, or the mixture thereof, further continue the reaction.

(Mode 9) The reactor according to Mode 8, wherein the means for applying the shearing force is scraping means, and the part of the means, which part is opposed to the inner wall, is an edge of the scraping means.

(Mode 10) An apparatus for producing hydrogen fluoride through a reaction of a metal fluoride with sulfuric acid, oleum and water, or a mixture thereof, characterized in that the reactor according to any one of Modes 1 to 5 is used.

(Mode 11) An apparatus for producing hydrogen fluoride through a reaction of a metal fluoride with sulfuric acid, oleum and water, or a mixture thereof, which apparatus comprises a prereactor and a rotary kiln, characterized in that at least one of the reactor according to Mode 6 or 7 as a prereactor and the reactor according to Mode 8 or 9 as a rotary kiln is used.

(Mode 12) A process for producing hydrogen fluoride through a reaction of a metal fluoride with sulfuric acid, oleum and water, or a mixture thereof, characterized in that the reactor according to any one of Modes 1 to 5 is used.

(Mode 13) A process for producing hydrogen fluoride through a reaction of a metal fluoride with sulfuric acid, oleum and water, or a mixture thereof, which process comprises a first reaction step wherein the reaction of the metal fluoride with sulfuric acid, oleum and water, or the mixture thereof partially proceeds, and a second reaction step wherein a reaction mixture resulting from the first reaction step further continue the reaction to substantially complete the reaction, characterized in that the process comprises at least one of or both of: conducting the first reaction step in the reactor according to Mode 6 or 7 as a prereactor; and conducting the second reaction step in the reactor according to Mode 8 or 9 as a rotary kiln.

BRIEF DESCRIPTION OF DRAWINGS

FIG. 2(a) shows a longitudinal schematic view of a prereactor used for the hydrogen fluoride producing apparatus according to the embodiment of FIG. 1, and FIG. 2(b) shows a cross sectional view taken along an X—X line in FIG. 2(a).

Figure 1:
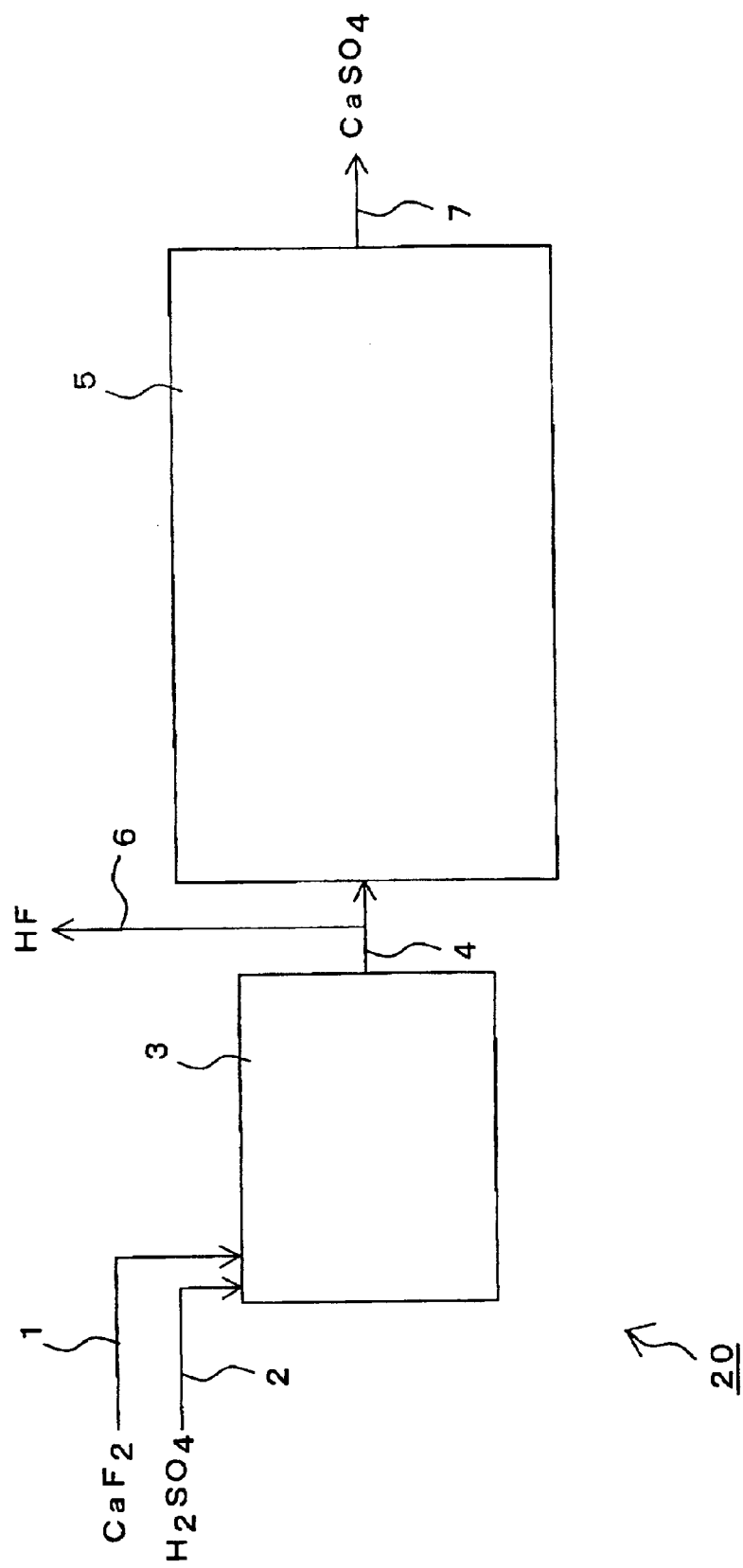
FIG. 1 shows a schematic view of a hydrogen fluoride producing apparatus according to one embodiment of the present invention.

It is noted that when referring the drawings, a longitudinal section means a section in the plane of the drawing of FIG. 1, and a transverse section means a section perpendicular to the plane of the drawing.

BEST MODE FOR CARRYING OUT THE INVENTION

Figure 3:
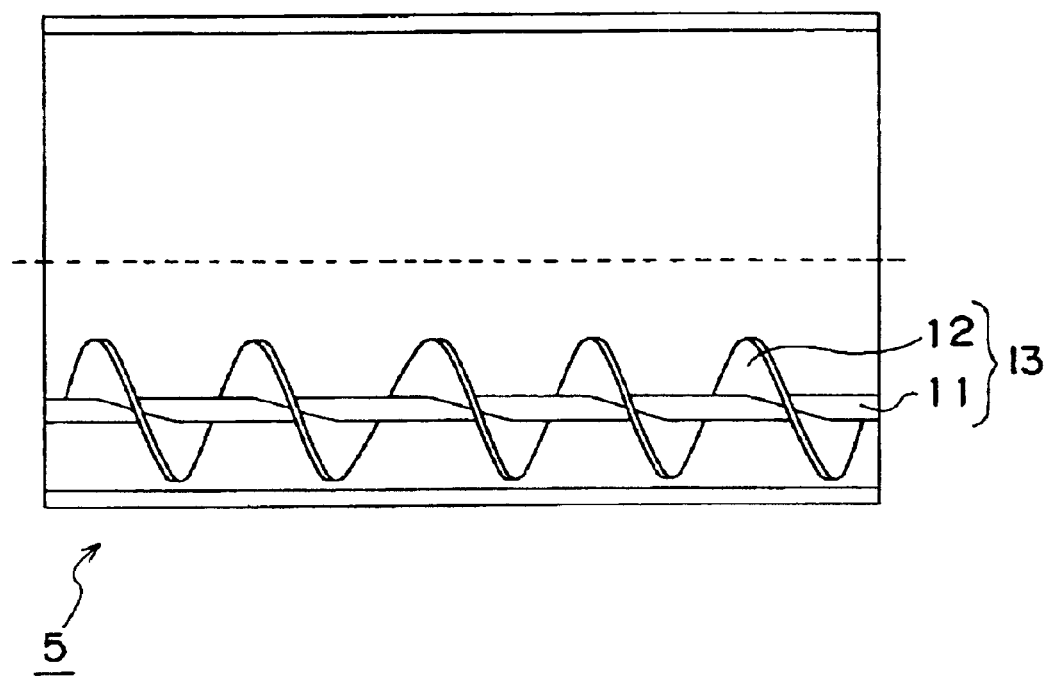
FIG. 3 shows a longitudinal schematic view of a rotary kiln also used for the hydrogen fluoride producing apparatus according to the embodiment of FIG. 1.

Hereinafter, one embodiment of the present invention will be described in detail with reference to FIGS. 1 to 3.

As shown in FIG. 1, an apparatus for producing hydrogen fluoride 20 of this embodiment includes a prereactor 3 (or a kneading machine such as a ko-kneader) to which fluorite ($CaF_2$) in the form of powder and concentrated sulfuric acid ($H_2SO_4$) as raw materials are charged through lines 1 and 2 respectively, a and rotary kiln 5 which receives a reaction mixture (including the raw materials and reaction products) discharged from the prereactor through a line 4. The hydrogen fluoride generating reaction goes through the first reaction step wherein the reaction partially proceeds in the prereactor 3, and the second reaction step wherein the reaction further proceeds to substantially finish in the rotary kiln 5. Hydrogen fluoride generated in the prereactor 3 and the rotary kiln 5 is collected through lines 4 and 6 as a crude hydrogen fluoride in the form of a gaseous product. On the other hand, a remaining reaction mixture in the form powder which mainly includes calcium sulfate ($CaSO_4$) as a by-product is taken out of the rotary kiln 5 through a line 7. The crude hydrogen fluoride thus obtained is subjected to separation and purification by means of a washing and/or distilling operation if necessary to form hydrogen fluoride with a high purity.

The prereactor 3 generally has a cylindrical inner surface. As shown in FIGS. 2(a) and 2(b), plurality of strips 8a made of a wear resistant-corrosion resistant metal material are placed on its inner surface in such a manner as "build-up welding" so that at least a portion of an inner surface of the prereactor 3 is made of the wear resistant-corrosion resistant metal material. The wear resistant-corrosion resistant metal material includes 30–90% by weight of tungsten carbide as well as a material or an alloy each of which includes at least one or not less than two elements respectively selected from the group consisting of nickel, chromium, cobalt, iron, tungsten and carbon. In this embodiment, the strips arranged in a stripe pattern on the inner surface are shown. (Areas shown with hatching in drawings mean that the areas are made of the wear resistant-corrosion resistant metal material.) However, the strips may be arranged in a random or ordered pattern, for example in a check pattern (a staggered pattern) or a dot pattern. Further, the present invention is not limited to the embodiment wherein a portion of the inner surface is made of the wear resistant-corrosion resistant metal material. Preferably, the whole of the inner surface of the prereactor is covered with the wear resistant-corrosion resistant metal material. Please note that the strips 8a are shown with a magnified thickness in FIGS. 2(a) and 2(b), and protrusions formed by welding the strips 8a on the inner surface are actually designed to be not larger than, for example, 5 mm at the most for the purpose of making degradation of heat transfer efficiency satisfactorily small.

In addition, the prereactor 3 is provided with a heating means (not shown) such as a jacket for heating the raw materials and reaction products when the reaction proceeds (these are simply referred to as a "reaction mixture"), and mixing blades 10 such as studs attached to a shaft 9 for kneading the reaction mixture and scraping off a part of the reaction mixture adhering to the inner surface of the prereactor 3. This mixing blade 10 corresponds to the means for applying the shearing force to the content therein (i.e. the reaction mixture) between the edge of the mixing blade 10 and the inner surface by the rotation of the shaft 9. Strips 8b made of the wear resistant-corrosion resistant metal material are applied to the edge of the mixing blade 10 in such a manner as build-up welding so as to connect the strip to an entire of the original edge of the blade respectively. The edge of the mixing blade 10, which is opposed to the inner surface, and the inner surface of the reactor 3 are positioned to leave a very small clearance. The prereactor is shown in drawings as it is provided with a single shaft having a set of stud type mixing blades (see FIG. 2(a)). However, the present invention is not limited to this. It is possible to use a prereactor having plural shafts, and also to use any suitable type of a mixing blade such as a helical type blade.

As to the rotary kiln 5, on the other had, the reaction mixture contained in the rotary kiln 5 rolls as the inner surface of a cylindrical shape rotates in its circumferential direction. The rotary kiln 5 is provided with a heating means (not shown) such as a jacket for heating the reaction mixture, and a scraping means (or a scraper) 13 for scraping off the reaction mixture adhering to the inner surface, wherein the scraping means 13 is constructed from a shaft 11 and a screw fin 12 or the like attached thereto as shown in FIG. 3. The edge of this screw fin 12, which is opposed to the inner surface, and the inner surface of the rotary kiln 5 are positioned to leave a very small clearance or contact with each other. The scraping means 13 corresponds to the means for applying the shearing force to the content therein (i.e. the reaction mixture) between the edge of the scraping means 13 (i.e. the edge of the screw fin 12) and the inner surface. An axis of the shaft 11 may be in the eccentric position as shown in FIG. 3 with respect to a rotation axis of the rotary kiln 5 (shown as a broken line) or in a concentric position with the rotation axis of the rotary kiln 5, as long as the scraping means 13 can scrape off the adhering reaction mixture over the entire inner surface by the rotation of the inner surface of the rotary kiln 5 along its circumferential direction. The scraping means 13 is preferably rotated, although the present invention is not limited to this.

The screw fin 12 and a material of the inner surface of the rotary kiln 5 are made of a corrosion resistant metal material such as Hastelloy. However, it is preferable that at least a portion of the edge of the screw fin 12 is made of the wear resistant-corrosion resistant metal material, and/or that at least a portion of and more preferably the whole of the inner surface of the rotary kiln 5 is made of the wear resistant-corrosion resistant metal material.

Then, a process in which the hydrogen fluoride producing apparatus of this embodiment is used will be described below in detail.

At first, fluorite ($CaF_2$) in the form of powder having a particle size of 0.1 $\mu$m to 2 mm and previously heated to about 40 to 200° C., and concentrated sulfuric acid ($H_2SO_4$) of 98% by weight previously heated to about 40 to 200° C. are separately supplied as the raw materials into the prereactor 3 through the lines 1 and 2 respectively such that the molar ratio of $CaF_2$:$H_2SO_4$ is at about 1:0.9 to 1:1.1. Then, a reaction mixture in the prereactor 3 is heated to and maintained at the temperature of about 40 to 200° C. by an externally heating means such as a jacket. At the same time, the mixing blades 10 fixed to the shaft 9 are rotated by the rotation of the shaft 9 to knead the reaction mixture while scrapes off a portion of the reaction mixture adhering to the inner surface. As a result, a hydrogen fluoride producing reaction partially proceeds to produce an aimed product of hydrogen fluoride and a by-product of calcium sulfate ($CaSO_4$), both as reaction products. Hydrogen fluoride is produced in the form of a gaseous product while calcium sulfate is produced in the form of powder. Therefore, the aimed product of hydrogen fluoride can be readily separated from the reaction mixture containing calcium sulfate. The gaseous hydrogen fluoride and the residual reaction mixture are taken out of the prereactor 3 through the line 4. The mean residence time of the reaction mixture in the prereactor 3 is about 2 to 30 minutes. In this case, the conversion ratio of fluorite at an outlet of the prereactor 3 is about 15 to 55%. The reaction mixture taken out of the prereactor 3 is generally in the form of slurry or paste.

Such slurry-like or pasty reaction mixture taken out of the prereactor 3 is transferred to the rotary kiln 5 through the line 4. In the rotary kiln 5, the reaction mixture is heated to and maintained at the temperature of about 150 to 350° C. by an externally heating means such as a jacket. The reaction mixture is rolled as the inner surface of the rotary kiln 5 rotates along its circumferential direction while the scraping means 13 (i.e. the shaft 11 and the screw fin 12 fixed thereto) revolve to scrape off a part of the reaction mixture adhering to the inner surface. As a result, the hydrogen fluoride producing reaction further proceeds to produce the aimed product of hydrogen fluoride and the by-product of calcium sulfate, both as reaction products. Similarly to the reaction in the prereactor 3, since hydrogen fluoride is produced in the form of a gaseous product while calcium sulfate is produced in the form of powder, the aimed product of hydrogen fluoride can be readily separated from the reaction mixture containing calcium sulfate. The residual reaction mixture is taken out of the rotary kiln 5 through the line 7. The mean residence time of the reaction mixture in the rotary kiln 5 is about 1 to 10 hours. In this case, the conversion ratio of fluorite at an outlet of the rotary kiln 5 is about 93 to 100%, so that the hydrogen fluoride producing reaction is considered to be substantially completed. Generally, the reaction mixture taken out of the rotary kiln 5 is in the form of powder and mainly composed of calcium sulfate.

Hydrogen fluoride (HF) as the aimed product which is generated in the prereactor 3 and the rotary kiln 5 is corrected through the lines 4 and 6 as a crude hydrogen fluoride in the form of the gaseous reaction product. Thus obtained crude hydrogen fluoride is preferably subjected to a washing and/or distilling operation.

The hydrogen fluoride producing process as described above is preferably conducted in a continuous process, though it is also possible to conduct it in a bath process.

According to this embodiment, there is provided a reactor for producing hydrogen fluoride through the reaction of fluorite with sulfuric acid as well as an apparatus and a process using the reactor, wherein the wear of an edge of the means for applying a shearing force to the content between the means and an inner surface of the reactor (a mixing blade and preferably a scraping means) is effectively reduced, and wherein the production capacity of the reactor is kept at a high level during a longer period.

It is noted that the present invention is not limited to the embodiments described above, but widely applicable to a case where the means for applying the shearing force to the content (such as a reaction mixture in the form of slurry or past) between the means and the inner surface, e.g. the mixing blade, is used in a reaction system which may cause a problem of corrosion. For example, the present invention is also applicable to a case where hydrogen fluoride is produced in a reaction system for generating hydrogen fluoride from fluorite; sulfur trioxide or anhydrous sulfuric acid; and water while mixing a reaction mixture in a single reactor by means of a mixing blade.

INDUSTRIAL APPLICABILITY

According to the present invention, there is provided the reactor which is used for a process for producing hydrogen fluoride through the reaction of fluorite with sulfuric acid and which has the means for applying the shearing force to the content between the means and the inner surface of the reactor, wherein the wear of the edge of the means for applying the shearing force is effectively reduced, and wherein the production capacity of the reactor is kept at a high level for a longer period. Furthermore there are provided the apparatus including such reactor and the process in which the apparatus is used.

EXAMPLE

In this Example, the used wear resistant-corrosion resistant metal material included: (I) an alloy containing about 67% by weight of Co, about 28% by weight of Cr, about 4% by weight of W, and about 1% by weight of C (wherein each ratios in weight is based on the total weight of the alloy); and (II) tungsten carbide, the content of tungsten carbide being about 60% by weight on the basis of the total weight of the metal material.

As described in the above embodiment, a prereactor made of a material which is commercially available in the trade name of MA-20Nb-3 (which corresponds to Carpenter 20cb3 and which is manufactured by Mitsubish Materials Corporation of Japan) was prepared and strips made of the above described wear resistant-corrosion resistant metal material each having a size of about 3 mm in thickness and about 30 mm in width were applied to the prereactor in a stripe pattern by build-up welding. Further, a strip made of the wear resistant-corrosion resistant metal material was applied to an edge of each mixing blade, which was attached to the prereactor, with a thickness of about 3 mm by build-up welding. The prereactor was assembled such that the clearance between the edge of the mixing blade and the inner surface of the prereactor was set at 13 mm as to an inner surface to which no strip was welded, and at 10 mm as to an inner surface to which the strip is welded. Then, a hydrogen fluoride producing apparatus prepared which included this prereactor together with a rotary kiln which is generally used. By using this apparatus, hydrogen fluoride was continuously produced similarly to the embodiment as described above.

After a continuous operation for a half year, an amount of wear was observed as to the inner surface of the prereactor and the edge of the mixing blade each of which was made of the wear resistant-corrosion resistant metal material as described above. The amount of wear in thickness was not greater than about 0.1 mm for each portion. Additionally, an amount of wear was remarkably decreased as to portions of the prereactor other than the portions at the inner surface made of the wear resistant-corrosion resistant metal material (that is, the portions made of MA-20Nb-3 (trade name)) in comparison with the case where no strip made of the wear resistant-corrosion resistant metal material was applied.

Comparative Example

Hydrogen fluoride was repeatedly produced in a continuous process as in the above Example except that the inner surface of the prereactor and the mixing blades provided for the prereactor were formed from only MA-20Nb-3 (trade name) described above without using the wear resistant-corrosion resistant metal material.

After a continuous operation for a half year, an amount of wear was observed as to the inner surface of the prereactor and the edge of the mixing blade each of which was made of MA-20Nb-3 (trade name). The amount of wear in thickness was about 10 mm for each portion, which amount of wear was 100 or more times as large as that in the case of the Example described above.

The present application claims a priority under the Paris Convention to Japanese Patent Application No. 2000-208172 filed on Jul. 10, 2000, entitled "HYDROGEN FLUORIDE PRODUCING APPARATUS AND PRODUCING PROCESS". The contents of that application are incorporated herein by the reference thereto in their entirety.

What is claimed is:

1. A reactor which is used for process for producing hydrogen fluoride through a reaction of a metal fluoride with sulfuric acid, oleum and water, or a mixture thereof and which comprises a reactor housing and a shearing structure movably disposed within the reactor housing for applying a shearing force to contents within the reactor housing against an inner surface of the reactor housing, wherein at least a portion of a part of the shearing structure which part is oppose to the inner surface of the reactor housing is made of a metal material which comprises 30 to 90% by weight of tungsten carbide and a material comprising 5 to 20% b weight of chromium and 5 to 40% by weight of cobalt.

2. The reactor according to claim 1, wherein at least a portion of the inner surface of the reactor is made of said metal material.

3. The reactor according to claim 1, wherein said metal material is formed by sintering tungsten carbide.

4. The reactor according to claim 1, wherein the reactor is a prereactor in which the metal fluoride is mixed with sulfuric acid, oleum and water, or the mixture thereof, and the reaction thereof partially proceeds.

5. The reactor according to claim 4, wherein said shearing structure is a mixing blade.

6. The reactor according to claim 1, wherein the reactor is a rotary kiln in which a reaction mixture resulting from the reaction of the metal fluoride with sulfuric acid, oleum and water, or the mixture thereof, further continue the reaction.

7. The reactor according to claim 6, wherein the shearing force is a scraping force.

8. An apparatus for producing hydrogen fluoride through a reaction of a metal fluoride with sulfuric acid, oleum and water, or a mixture thereof, which apparatus comprises a reactor having a reactor housing and a shearing structure movably disposed within the reactor housing for applying a hearing force to contents within the reactor between the shearing structure and an inner surface of the reactor housing, wherein at least a portion of a part of the shearing structure which part is opposed to the inner surface of the reactor housing is made of a metal material which comprises 30 to 90% by weight of tungsten carbide and a material comprising 5 to 20% by weight of chromium and 5 to 40% by weight of cobalt.

9. An apparatus for producing hydrogen fluoride through a reaction of a metal fluoride with sulfuric acid, oleum and water, or a mixture thereof, which apparatus comprises a prereactor and a rotary kiln, wherein at least one of the prereactor and the rotary kiln has a shearing or scraping structure for applying shearing or scraping force to its content between the shearing or scraping structure and its inner surface, and at least a portion of a part of the shearing or scraping structure which part oppose to the inner surface is made of a metal material which comprises 30 to 90% by weight of tungsten carbide and a material comprising 5 to 20% by weight of chromium and 5 to 40% by weight of cobalt.

10. A process for producing hydrogen fluoride through a reaction of a metal fluoride with sulfuric acid, oleum and water, or a mixture thereof in a reactor which has a shearing structure movably disposed within the reactor for applying a shearing force to contents within the reactor between the shearing structure and an inner surface of the reactor, wherein at least a portion of a part of the shearing structure which part is opposed to the inner surface of the reactor is made of a metal material which comprises 30 to 90% by weight of tungsten carbide an a material comprising 5 to 20% by weight of chromium and 5 to 40% by weight of cobalt.

11. A process for producing hydrogen fluoride through a reaction of a metal fluoride with sulfuric acid, oleum and water, or a mixture thereof, which process comprises a first reaction step wherein the reaction of the metal fluoride with sulfuric acid, oleum and water, or the mixture thereof partially proceeds in a prereactor, and a second reaction step wherein a reaction mixture resulting from the first reaction step further continue the reaction to substantially complete the reaction in a rotary kiln, wherein at least one of the prereactor and the rotary kiln has a shearing or scraping structure for applying shearing or scraping force to contents therein between the shearing or scraping structure and its inner surface, and at least portion of a part of the shearing or scraping structure which part is opposed to the inner surface is made of a metal material which comprises 30 to 90% by weight of tungsten carbide and a material comprising 5 to 20% by weight of chromium and 5 to 40% by weight of cobalt.

12. The reactor according to claim 1, wherein the material comprising chromium and cobalt further comprises at least one element selected from the group consisting of nickel, iron, tungsten and carbon.

\* \* \* \* \*

UNITED STATES PATENT AND TRADEMARK OFFICE
CERTIFICATE OF CORRECTION

PATENT NO. : 6,841,140 B2 Page 1 of 1
APPLICATION NO. : 10/312869
DATED : January 11, 2005
INVENTOR(S) : Nishimura et al.

It is certified that error appears in the above-identified patent and that said Letters Patent is hereby corrected as shown below:

Please change:

On the title page item (86) PCT No.: PCT/JP01/05868

§ 371 (c)(1),
(2), (4) Date: January 2, 2003 to

(86) PCT No.: PCT/JP01/05868

§ 371 (c)(1),
(2), (4) Date: February 3, 2003

Also change:

On the title page under item (56), FOREIGN PATENT DOCUMENTS

DE 319931 4/1957 to

CH 319931 4/1957

Signed and Sealed this

Thirteenth Day of November, 2007

JON W. DUDAS
*Director of the United States Patent and Trademark Office*